March 18, 1969 — W. DRABIK — 3,433,541
TRACTION MOTOR AXLE BEARING DUST GUARD
Filed June 30, 1967
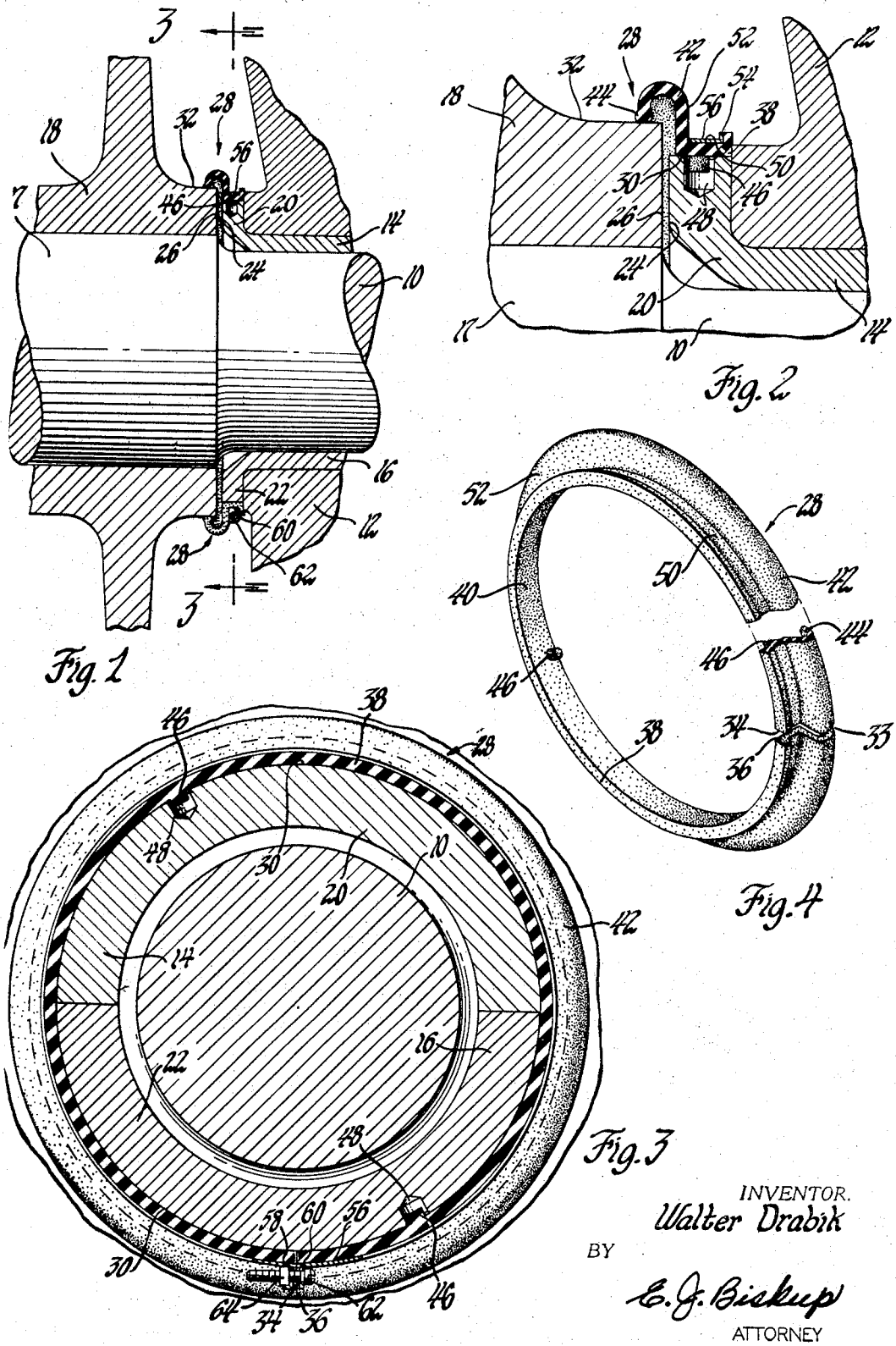
INVENTOR.
Walter Drabik
BY
E. J. Biskup
ATTORNEY 3,433,541
TRACTION MOTOR AXLE BEARING DUST GUARD
Walter Drabik, Downers Grove, Ill., assignor to General Motors Corporation, Detroit, Mich., a corporation of Delaware
Filed June 30, 1967, Ser. No. 650,381
U.S. Cl. 308—36.1                                    4 Claims
Int. Cl. F16c 33/74; F16j 15/16, 15/32

ABSTRACT OF THE DISCLOSURE

A molded one-piece elastomeric dust guard for sealing between the thrust bearings and the wheels of a locomotive traction motor wherein the dust guard is initially wrapped around the outer surface of the thrust flange and prepositioned thereon by integrally formed locating studs that are received within complementary locating holes formed in the thrust flange. The studs and holes are relatively sized to permit limited axial and circumferential shifting of the dust guard about the thrust flanges to an accurately aligned position. An adjustable steel band, retained in a semi-dovetail groove formed in the dust guard, is contracted to sealingly clamp the dust guard to the thrust flange.

---

The dust guards for sealing the bearings of locomotive traction motors have conventionally used a pair of 180° metallic casing segments that are adapted to be mounted in opposing relationship on the thrust flanges of the bearing sleeves. In order to achieve the rigid mounting necessitated by the extreme vibrations transmitted by metal-to-metal contact from the locomotive wheels to the dust guard, the segments are positioned within radial or circumferential grooves formed in the thrust flanges and secured thereto by interference fits, tapered pins, screws, or other positive fastening means. Such an installation requires accurate machining of the interfitting surfaces of the thrust flanges and the casing segments as well as precise locating of the fastening means. In addition to the obvious complexity of aligning and installing such an assembly, the replacement of a damaged or worn dust guard is also a costly and time consuming operation. In other words, to remove a damaged dust guard, as for example to replace the sealing strip, expensive techniques must be used to remove the normally inaccessible fasteners and, at times, such removal results in damage to either the normally reusable dust guard casing or the thrust flange.

To overcome the above difficulties of manufacture and installation as well as to provide an efficient fluid seal and dust guard securely fastened by a vibration-free mounting, the dust guard made in accordance with the present invention uses a split one-piece sealing member formed of an elastomeric material. The dust guard can be conveniently wrapped around the outer circumferential surface of the thrust flange and is preliminarily positioned thereon by integrally formed locating studs that register with locating holes formed in the thrust flange. The studs and the holes are relatively sized to permit limited axial and circumferential adjustment of the dust guard. The intentional clearance between the studs and the holes plus the inherent compressibility and contourability of the elastomeric dust guard relaxes the machining tolerances for the thrust flanges thereby promoting the interchanging and replacing of parts. The dust guard is securely clamped to the thrust flange by an adjustable steel band securely retained in a semi-dovetail groove formed in the outer surface of the dust guard. When the dust guard has been properly positioned, the adjustable band is contracted until the molded gap between the ends of the dust guard has been closed and the same is positively and sealingly clamped to the thrust flange. The resulting assembly provides a continuous annular barrier to foreign material and acts as an effective fluid seal for the bearing lubricants.

Accordingly, the objects of the present invention are: to provide an effective dust guard for the bearings of a locomotive traction motor that can be accurately positioned and easily installed and removed; to provide a traction motor dust guard that is formed entirely of an elastomeric material that provides a vibration-free mounting and is sealingly contourable to the outer surface of the thrust flange by means of a contractable steel band; and to provide a split one-piece elastomeric dust guard for a locomotive traction motor that is prepositioned in assembly by integrally formed locating studs registering with locating holes formed in the bearing thrust flanges in a manner that permits limited axial and circumferential shifting of the dust guard to a final accurately aligned position, and is securely clamped to the thrust flange by a contractable steel band that is axially and radially retained in a semi-dovetail groove formed in the outer surface of the dust guard.

These and other objects will be apparent to one skilled in the art upon reading the following detailed description, reference being made to the accompanying drawings in which:

FIGURE 1 is a side cross-sectional view of a traction motor assembly incorporating a dust guard made in accordance with the present invention;

FIGURE 2 is an enlarged partial cross-sectional view of the assembly shown in FIGURE 1;

FIGURE 3 is an enlarged cross-sectional view taken along line 3—3 of FIGURE 1; and FIGURE 4 is a perspective view of the dust guard shown in FIGURES 1 through 3.

Referring now to FIGURE 1, there is shown a portion of a conventional traction motor for a diesel locomotive including an axle 10 rotatably supported within the traction motor housing 12 by bearing half sleeves 14 and 16. The axle 10 has a pinion-end drivingly connected to the traction motor (not shown) and has an enlarged projecting shaft portion 17 that engages and is locked to a wheel member 18. Radially outwardly extending arcuate thrust flanges 20 and 22 are formed at the outward ends of the bearing sleeves 14 and 16 and, as shown in FIGURE 3, form an annular axially facing thrust surface 24 that cooperates with an opposed complementary thrust surface 26 on the wheel member 18.

Lubricating oil is normally disposed between the axle 10 and the inner cylindrical surfaces of the bearing sleeves 14 and 16 as well as between thrust surfaces 24 and 26. To prevent dirt and contaminants from reaching this area, the dust guard 28 of the present invention is secured to the radially outwardly extending circumferential surface 30 of the thrust flanges 20 and 22 and has a portion that sealingly engages the axially extending hub portion 32 of the wheel 18. Referring to FIGURE 4, the dust guard 28, molded from an abrasion and oil resistant elastomeric material such as carboxylated nitrile rubber, is formed with a gap 33 and defines a split one-piece construction having circumferentially spaced end surfaces 34 and 36. The molded inner diameter of the dust guard 28 is slightly larger than the outer diameter thrust surface 24 to allow axial and circumferential positioning of the same about surface 30. The gap 33 is sized so that the end surfaces 34 and 36 will be in abutting back-to-back engagement when the dust guard is secured to the surface 30 by means to be described below.

Generally, the dust guard 28 comprises an axially extending sealing collar 38 having a radially inwardly extending circumferential surface 40 and a sealing annulus 42. The sealing annulus 42 is generally toroidal in shape and is integrally formed at the axial outward edge of the sealing collar 38. The curved portion of the sealing annulus 42 terminates at an enlarged annular sealing surface 44 that is adapted to compressively engage the hub portion 32. Formed on the inner circumferential surface 40 are diametrically opposed, radially inwardly extending locating studs 46. As will be subsequently described, the locating studs 46 are adapted to be received within the complementary locating holes 48 formed in the surface 30 of the thrust flanges 20 and 22. The locating holes 48 have a greater cross-sectional area than the locating studs 46 thereby permitting limited axial and circumferential movement of the sealing collar 38 relative to the surface 30 in assembly. A semi-dovetail groove 50 is formed in the outer circumferential surface of the sealing collar 38. The inward surface 52 of the sealing annulus 42 forms one axial side wall of the groove 50 and a conical wall 54 partially overlying a portion of the groove 50, establishes the opposing side wall. An adjustable steel band 56 is adapted to be received within the groove 50 and is axially retained therein by walls 52 and 54 and restrained against radially outwardly movement by the conical wall 54. The band 56 encircles the sealing collar 38 and has outwardly bent ends 58 and 60 that are interconnected by an adjusting screw 62 and adjusting nut 64 threaded therebetween. The adjusting screw 62 and adjusting nut 64 provide an adjusting mechanism for contracting or expanding of the band 56 to selectively vary its nominal diameter.

The dust guard 28 is attached to the thrust flanges 20 and 22 by spreading end portions 34 and 36 and wrapping the sealing collar 38 around surface 30. The dust guard 28 is then shifted circumferentially and axially until locating studs 46 are received within locating holes 48. In this position, the dust guard is approximately located with respect to the thrust flanges 20 and the wheel 18. The adjustable band 56 is then inserted in the groove 50 and loosely contracted by adjustment of screw 62. Thereafter, the dust guard is accurately axially positioned on the thrust flanges and the band 56 is further contracted to tightly secure the sealing collar 38 to surface 30 and close the gap 33 thereby providing a continuous annular barrier to dirt and contaminants as well as an effective fluid seal for the bearing lubricants.

It should be apparent that the number and location of the locating studs 46 and locating holes 48 can be varied without departing from the scope of the invention. If such an alteration is deemed desirable, it should be remembered that the relative sizes of the studs 46 and holes 48 should permit limited axial and circumferential movement of the sealing collar 38 but should not be of a size or number that would impair contraction of the dust guard 28 to its final installed form. Additionally, other adjusting mechanisms could be used, such as the wormed gear fasteners conventionally used on hose clamps. Whatever adjusting mechanism is selected, adequate provision should be made for contracting the band from a free diameter in preliminary assembly to a diameter wherein a sufficient clamping force is applied to the sealing collar 38 to sealingly secure the dust guard 28 to the thrust flanges.

What is claimed is:

1. The combination of a single split resilient dust guard having circumferentially spaced end surfaces and a bearing, said bearing having a main cylindrical bearing surface and an integral radially outwardly extending annular thrust flange at one end thereof, a plurality of radially inwardly extending locating holes formed in a radially outwardly facing surface of the thrust flange, said dust guard having a sealing collar wrapped around the thrust flange and including a radially inwardly facing surface circumferentially engaging the radially outwardly face surface of the thrust flange, a plurality of radially inwardly extending locating studs integrally formed on the inwardly facing surface of the sealing collar, each of said locating studs received within one of the locating holes, said locating holes having a greater cross-section area than the locating studs to permit limited axial and circumferential movement of the sealing collar relative to the thrust flange, a sealing annulus formed integrally with the sealing collar and extending axially outwardly from the thrust flange, said sealing annulus terminating at a radially inwardly facing sealing surface adapted to compressively engage a wheel member rotatably supported by the bearing, and adjustable means retained by the sealing collar and adapted to fixedly secure the latter to the thrust flange.

2. The combination of a single split resilient dust guard having circumferentially spaced end surfaces and a bearing, said bearing having a main cylindrical bearing surface and an integral radially outwardly extending annular thrust flange at one end thereof, a pair of diametrically opposed radially inwardly extending locating holes formed in a radially outwardly facing surface of the thrust flange, said dust guard having a sealing collar wrapped around the thrust flange and including a radially inwardly facing surface circumferentially engaging the radially outwardly face surface of the thrust flange, a pair of diametrically opposed radially inwardly extending locating studs integrally formed on the inwardly facing surface of the sealing collar, each of said locating studs received within one of the locating holes, said locating holes having a greater cross-section area than the locating studs to permit limited axial and circumferential movement of the sealing collar relative to the thrust flange, a sealing annulus formed integrally with the sealing collar and extending axially outwardly from the thrust flange, said sealing annulus terminating at a radially inwardly facing sealing surface adapted to compressively engage a wheel member rotatably supported by the bearing, and an adjustable band axially and radially retained in a groove formed in the sealing collar and adapted to apply a clamping force to fixedly secure the latter to the thrust flange and bias said end surfaces into abutting relationship to provide a continuous annular barrier to dirt and contaminants.

3. A dust guard, comprising: a single split annular elastomeric sealing member having circumferentially spaced end surfaces, said sealing member including an axially extending sealing collar having a generally toroidal sealing annulus formed at one end thereof, said sealing annulus terminating at a radially inwardly facing sealing surface; a plurality of studs formed on a radially inwardly facing surface of said sealing collar; a circumferentially extending groove formed in a radially outwardly facing surface of said collar; and an adjustable band retained in said groove for radially biasing said sealing collar and circumferentially biasing said end surfaces.

4. A dust guard, comprising: an annular sealing member formed of an elastomeric material and having a single axial gap defining circumferentially spaced end surfaces, said sealing member including an axially extending sealing collar and a generally toroidal sealing annulus, said sealing annulus being formed integrally with one end of the sealing collar and extending axially outward therefrom; a radially inwardly facing sealing surface formed at a terminal portion of said sealing annulus; a plurality of locating studs formed on a radially inwardly facing surface of said sealing collar; a circumferentially extending groove formed in a radially outwardly facing surface of said sealing collar, said groove being defined by a recessed base, one surface of said sealing annulus, and a conical wall partially overlying said base; and an adjustable metallic band received in said groove for radially biasing said sealing collar and circumferentially biasing said end portions, said band being axially and radially retained in said groove by said one surface of said sealing collar and said conical wall.

References Cited
UNITED STATES PATENTS

| | | | |
|---|---|---|---|
| 2,105,777 | 1/1938 | Smith | 277—136 |
| 3,127,222 | 3/1964 | Hanson | 308—36.1 |
| 3,140,903 | 7/1964 | Stricklin et al. | 308—36.1 |

MARTIN P. SCHWADRON, *Primary Examiner.*

F. SUSKO, *Assistant Examiner.*